Feb. 5, 1957 C. W. ASPEY 2,780,264
SECTIONALLY INTERLOCKING PLATE NUT
Filed Dec. 7, 1953
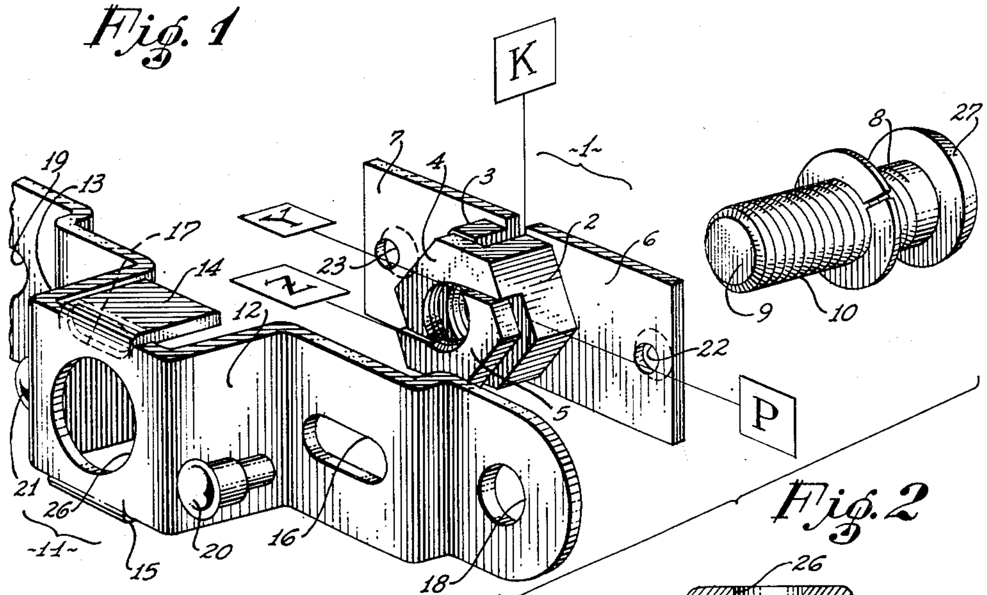
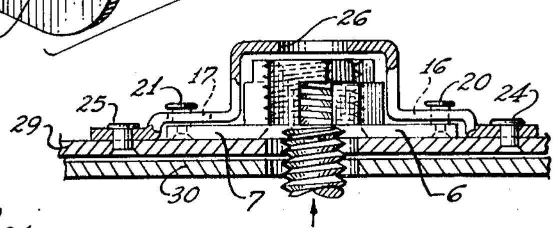
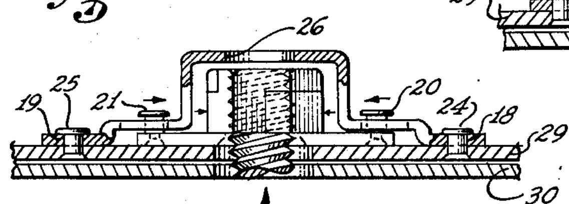
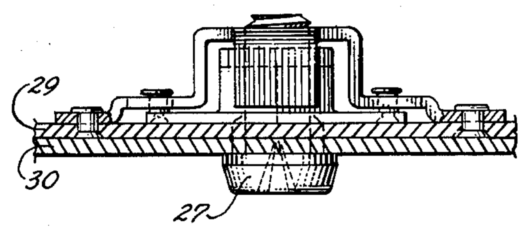
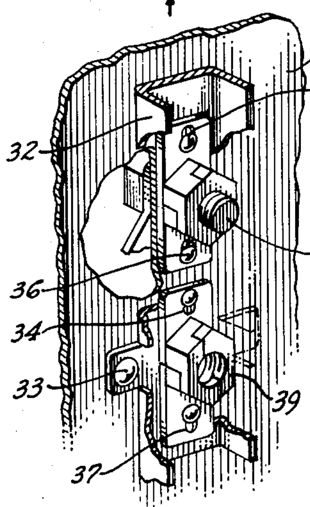
INVENTOR:
Cecil W. Aspey
By Herbert E. Metcalf
His Patent Attorneys United States Patent Office 2,780,264

Patented Feb. 5, 1957

2,780,264

SECTIONALLY INTERLOCKING PLATE NUT

Cecil W. Aspey, Los Angeles, Calif., assignor to Northrop Aircraft, Inc., Hawthorne, Calif., a corporation of California Application December 7, 1953, Serial No. 396,429

8 Claims. (Cl. 151—41.71)

This invention relates to the general field of nut and bolt type fasteners, and more particularly to a sectional plate nut adapted for quick attachment with and release of a conventional threaded bolt.

Most fasteners of the quick attach variety are composed of mating pairs of bolt and nut portions which are fixed not only in conformation but in matters of tension, length of shank and adjustability; and, in most cases, they require special pre-forming of the structural sections to be attached and involve the use of special installation tools and accessories.

There are several important objects of this invention:

One important object of this invention is the provision of fastening means in which the receptor portion, which remains permanently attached to one of the sections to be fastened, contains the modifications which are a part of this invention, while the insert portion of the fastener can be any threadably engageable standard bolt of any length and with any head conformation desired.

A further object of this invention is the provision of fastening means of the character described in which frequent replacements of the insert portion necessitated by wear or loss, or stress requirements, can be obtained through conventional sources of supply, or made by hand with simple and standard hand tools.

Another object of this invention is the provision of fastening means in which the receptor portion is adapted to permit partial entry of the insert portion in spite of substantial deviation from proper axial alignment of the two members, and is further adapted to overcome this misalignment as the insert is further engaged until the two members are forced into true co-axial alignment.

A further important object of this invention is the provision of fastening means providing the same strength and holding power characteristic of a conventional nut and bolt fastening, yet requiring comparatively few turns of the insert portion to effect complete engagement or disengagement with entire length of interior thread of receptor member.

A still further object of this invention is the provision of fastening means having the features above mentioned and adapted to be moveably attached to the surface of one of the objects to be fastened enabling it to move thereon to compensate for lateral variations in position of insert member when the second object to be fastened is juxtaposed with the first.

In brief, my invention comprises a nut which is divided axio-diametrically into symmetrical halves each having a laterally extending arm, cut from the body portion of the other half and including the last few convolutions of inner thread, which project around the arc of the center bore opposite from their respective body portions. The two sections of the nut are loosely held in proper adjacency by a conventional cup-like retainer which permits lateral relative movement of the two halves but prevents them from turning. Entry of a bolt into the chamfered end of the threaded bore of the nut forces the two body portions apart and their respective arms together, permitting the bolt to slide past the threads of the body sections into contact with the projecting arms which, in turn, are forced apart when the bolt is turned into their inner threads thereby drawing the body portions together again and their inner threads into engagement with the external threads of the bolt.

For a better understanding of this invention a detailed description of one preferred embodiment is given and references are made to the accompanying drawings in which:

Figure 1 is an exploded perspective view of the nut retainer, the sectional nut and the threaded bolt as used in one embodiment of this invention.

Figure 2 is a fragmentary diagrammatic sectional view of a sectional nut and retainer installed on a structural member showing the end of a bolt being entered in the threaded bore.

Figure 3 is a fragmentary diagrammatic sectional view of the assembly shown in Figure 2, showing the bolt engaged with all of the threads of the nut bore.

Figure 4 is a diagrammatic sectional view similar to Figures 2 and 3, showing the bolt tightened within the nut and drawing the two structural members together in firm attachment.

Figure 5 is a fragmentary diagrammatic perspective view of the inner side of a length of gang nut channel installed on a vertical structural panel with two sectional nuts in place thereon, and with portions of the gang channel cut away to reveal the nut sections mounted therein.

Referring now to Figure 1, in which the bolt retaining means 1 is shown with its complementary parts, cup member 11 and threaded bolt 10, it should be understood that the bolt 10 is a standard unmodified bolt threadably engageable with bolt retaining member 1 and of any length and head conformation suitable to the particular installation, and no claims covering the bolt itself will be made. However, the fact that a standard bolt is used is a most important consideration in the evaluation of this invention since the provision of a quick attach and quick detach fastening means utilizing any standard bolt of proper thread size as the insert member is one of the most significant objects of this invention. Likewise, no specific claims are made concerning the nut container 11, nor to the general gang channel assembly of Figure 5, and they are shown and described only because they are typical of many such means generally used to expedite assembly operations.

The perspective view of the sectional nut member 1 in Figure 1 shows clearly the line of separation between the two sections. For descriptive purposes the two nut sections may be regarded as half portions of a standard conventional nut. Externally the half portions are symmetrical in conformation and appearance, the only actual difference between them being the axial location of their segments of the thread within the central bore.

Each half portion has a main body area, 2 and 3, and an extending hook member, 4 and 5, disposed around the arc of the central bore spaced from the main body area of each half portion. The line of separation between the two half portions begins at the face of the nut disposed toward the bolt member as in Figure 1, and follows an axio-diametric plane perpendicular to opposite parallel sides of the nut body, as indicated in perspective by plane K, to within a few threads of the opposite face 4 and 5. The line of separation is then rotated equilaterally of the axis and in a plane perpendicular thereto, as indicated by plane P in Figure 1, through approximately two thirds of the two half-nut body portions on each side of the threaded central bore, and the half portions are finally completely separated along two lines of division disposed in planes Y and Z which planes are parallel to and equidistant from the longitudinal axis, perpendicular to the original plane of separation of the two half portions (plane K) and tangent to opposite sides of the threaded bore of the nut member.

Since the planes Y and Z along which the hook members 4 and 5 are separated from the adjacent body portions 2 and 3 are necessarily parallel to each other, the two half portions 2 and 3 may be moved apart in the direction of these final lines of separation, and as they are moved apart laterally of the longitudinal axis of the bore, their hook members 4 and 5 are drawn together inwardly of the normal circumference of the threaded bore until they contact each other and prevent further outward movement of their respective body portions.

Experience gained in making various test and demonstration models of this interlocking segment nut indicates that the operation of the fastener is better when the two half-nuts are loosely fitted and there is a generous amount of space between them along the various lines of separation as, for instance, is the case when a standard nut approximately three-eighths inch by twenty thread size is actually cut apart by hand using a band saw for the main axial cut along plane K in Figure 1, and coping and hack saws for the radial cut, along plane P, and for the final cuts through the top of the nut tangent to opposite sides of the bore in planes Y and Z. The amount of material removed from the segments by the saw cuts allows the segments to move freely relative to each other in response to pressures in any direction caused by the insertion, tightening or removal of the bolt member.

As long as each of the outwardly curving hook members, 4 and 5, extends more than half way around the side of the bore opposite from its respective half-nut portion, a bolt pressed inwardly between them will, first, align the hook members in the same transverse plane and, secondly, enter their threads without difficulty thereby forcing the hook members into true circular positioning and simultaneously drawing the half-nut portions into the same circular relationship as seen at 38 in Figure 5 in which their threads necessarily also engage those of the bolt member.

Conversely, upon unthreading the bolt, the hook members are freed to move toward each other which they will do immediately if there is tensional strain on the bolt or if the bolt is pulled outwardly or moved laterally relative to the main axial plane of separation.

It also is to be remembered that only a relatively small amount of lateral movement from the main axial plane of separation is required (actually just slightly more than the depth of the threads) to disengage the threads of the half-nut portions from those of the bolt. The direction of movement must be normal to the plane of separation, plane K, because the threaded sections in the half-nut portions are semi-cylindrical, and the half-nuts themselves could not be moved in the direction of the plane of separation as long as a bolt was disposed between them.

To prevent any tendency of the half-nut portions to move in any direction other than substantially normal to the plane of separation, plane K, the retaining walls of the nut cup or gang channel, such as 14 and 15 in Figure 1, and 32 in Figure 5, which are also intended to keep the nut from rotating, are positioned so as to bear against the two opposite and parallel flat side walls of the nut which are bisected by the plane K of separation.

As has been explained, only a small amount of movement of the half-nuts is required to provide sufficient space for the bolt threads to slide over and past those in the half-nuts, and the respective hook members are only required to move together to the same extent. The space provided between the terminal ends of the hook members and the body portions of the half-nuts from which they are cut along planes tangent to the side of the nut bore, enables the hook members to move together even more than enough to release the bolt member from the threads of the half-nuts.

As shown in Figure 1, each half portion of the nut member is attached to a generally rectangular base plate 6 and 7, the two juxtaposed edges of the plates being flush with the line of separation through the side walls of the nut members and chamfered around the bolt receiving aperture of the threaded bore as seen in Figure 2. Positioning studs 20 and 21 in Figure 2 are fixed in base plate bores 22 and 23 in Figure 1 and are adapted to movably retain the half portions within any suitable cup or retaining means attached to the inner surface of the second work piece to be fastened, such as the generally conventional retaining shell 11 shown in Figure 1 and the typical gang channel shown in Figure 5 on which, as has been stated, no invention is claimed.

When used with the retaining shell 11 as shown in Figures 1 through 4, the studs 20 and 21 extend upwardly from bores 22 and 23 in base plates 6 and 7 and are engaged in longitudinal slots 16 and 17 in the shell frame 11 in which they are movable relative to the axis of the central bore. The shell 11 is attached to the inner work piece 29 by rivets 24 and 25 disposed through bores 18 and 19. In this typical retainer shell 11 the laterally disposed side plates 14 and 15 in Figure 1 serve to keep the half portions in substantial longitudinal alignment when the bolt is removed from between them.

The typical gang channel assembly shown in Figure 5 consists of a main longitudinal channel member 32, U-shaped in cross section, having suitable means for attachment 33 to work piece 31, and having a plurality of the sectional nut members covered by this invention secured in tandem arrangement between the outwardly extending side walls of the channel by means of stud members 35 and 36 fixed in, and extending outwardly from the central section of the channel member to engage longitudinal slots 34 and 37 in the nut plates.

In this assembly the outwardly extending channel side walls serve to keep the nut body half portions in suitable longitudinal alignment when bolts such as 38 are withdrawn from nut members, as at 39.

In addition to the retaining methods just described which are well known and generally practiced in the art, the nut plates may be provided with longer slots adapted to engage two spaced positioning studs extending outwardly from the gang channel, thus keeping the plates and their respective nut sections in proper longitudinal alignment yet permitting them to move relative to each other within the limits established by the spacing of the studs within the slots. Another simple and thoroughly satisfactory installation can be made by enclosing the two nut sections, without base plates, in a shell-like cup member centered and secured over the bolt receiving bore in the second work piece, the cup member being internally dimensioned narrow enough to keep the nut sections from rotating and long enough to permit the two half portions to move apart until restrained by their overlapping hook members.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A bolt retaining nut member comprising: a generally conventional nut member having a central internally threaded bore and at least one pair of oppositely disposed parallel flat sides engageable by removable means for keeping the nut from rotating or causing it to rotate, said nut member being slit into two generally symmetrical half-nut portions having faces along an axio-diametrically disposed plane of separation following an axial plane of separation bisecting each of one pair of said parallel sides, said plane of separation extending from the face of said nut member to within a few threads of the spaced end of said threaded bore, said plane of separation then being rotated equilaterally of the axis of said central bore and finally continued axially through the top of the nut spaced from said face whereby each of said half-nut portions is provided with an internally threaded arm-like hook member cut from the top of the other half-nut portion and curving outwardly around said central threaded bore on the opposite side thereof from its respective half-nut portion, whereby when the faces along said plane of separation between said hook members and said half-nut portions from which they are cut are rotated equilaterally of the axis of said threaded bore along a single plane parallel to said top of said nut member, said hook members while supported in the same horizontal plane, will move without interference across the portions of said half-nut portion from which they are cut, said hook members being arranged for drawing said half-nut portions into threaded engagement with a bolt member entered therebetween, and to release said bolt from threaded engagement with said half-nut portions when said bolt member is unthreaded from between said hook members; a nut retaining member attached to one of the objects to be fastened; and means associated with said nut retaining member for limiting relative movement of said half-nut portions to a line of movement normal to the axial plane of separation of said nut members.

2. A bolt retaining nut member as set forth in claim 1 wherein said means for drawing said half-nut portions into threaded engagement with a bolt member entered therebetween comprise: generally pointed terminal ends provided on said hook members, said terminal ends being severed diagonally and being extended along their inner threaded edges beyond the terminations of their respective outer edges in terms of radial rotation so that the threaded inner edges of said hook members substantially encircle a bolt threaded therein on the sides thereof opposite their respective half-nut portions, whereby the threads of said respective half-nut portions are necessarily drawn into engagement with those of said threaded bolt member thereby holding said bolt member in firm attachment and being restrained from relative lateral movement in any direction.

3. A nut member as set forth in claim 3 and in which the terminal ends of said hook members and the half-nut portions from which said hook members are cut are disposed in planes parallel to said oppositely disposed parallel sides of said nut member, said planes also being perpendicular to said axial plane of separation of said half-nut members and tangent to opposite inner sides of said threaded bore of said nut member whereby said hook members are enabled to move toward each other across the upper opening of said threaded bore when a bolt member is unthreaded from between them, said movement being normal to said plane of separation of said half-nut portions and coincidentally enabling said half-nut portions to move apart and release said threads of said bolt member from engagement therein.

4. A nut member as set forth in claim 3 and in addition comprising means for limiting the relative movement of the half-nut portions to movement normal to said axial plane of separation, comprising: a generally rectangular nut cup having two parallel sides, two parallel ends, a bottom and an open top, said cup having outwardly extending means for attachment to the inner surface of an object to be fastened, and being dimensioned to fit over said nut member with the face of said nut against said inner surface and with the axial plane of separation of said nut parallel to the ends of said cup, and said sides of said cup being spaced closely enough to prevent rotation of said nut member therebetween but sufficiently apart to enable said nut to slide longitudinally, said ends of said cup being relatively spaced to permit movement of said half-nut portions of said nut member required to release a threaded bolt therefrom.

5. An interlocking segment nut member as set forth in claim 3 in which each of said hook members is cut from the top of the opposite half-nut portion by means of an axial cut, disposed in a plane parallel to the face of said nut member, made clockwise around said threaded bore of said nut member relative to said face thereof from said axial plane of separation to the plane of the final cut through the top of said nut member.

6. A quickly attachable and detachable fastener including a receptor member and an insert member as set forth in claim 5, and in which the insert member comprises: any threadably engageable unmodified standard bolt of conventional conformation, of any length and having any type of head on one end thereof.

7. A multiple fastening assembly providing a plurality of spaced bolt and nut type fasteners in which said individual fasteners consist of the two piece bolt and interlocking-segment nut fasteners as set forth in claim 6, together with means for supporting said fasteners in proper relative spacing, maintaining the attachment of the nut members to the structural part to be fastened when bolt members are removed, and for keeping said nut members from rotating when bolts are tightened therein, comprising: a longitudinally extended section of U-channel fixedly attached to a structural part to be fastened, and having a basal portion through which a plurality of spaced bolt-receiving bores are disposed, and two parallel outwardly extending side walls spaced apart sufficiently to receive said nut members therebetween when said nut members are positioned with their axial planes of separation at right angles to said side walls yet close enough to prevent said nut members from rotating therein; a generally flat base plate slidable within said U-channel against the basal portion thereof, fixedly attached to each of said half-nut portions in flush alignment with the face thereof and extending outwardly therefrom in the direction opposite from the hook member thereof, said plate having a centrally disposed longitudinally elongated slot in which is centered a headed stud member attached to said basal surface of said U-channel, whereby said half-nut portion is retained within said U-channel in proper adjacency to one of said bolt-receiving bores through said basal portion thereof, and whereby it is also restrained from rotating when a bolt member is tightened therein, and whereby it is securely positioned yet slidable within the limits of channel-wise movement permitted by the length of said longitudinally extended slot in said base plate.

8. An interlocking-segment nut member adapted to cooperate with a conventional bolt of standard thread and any head conformation, comprising: a generally conventional nut member having a central internally threaded bore and at least one pair of oppositely disposed parallel flat sides engageable by removable means for keeping said nut from rotating, said nut member being slit apart along the line of an axio-diametric plane bisecting each of one pair of said oppositely disposed parallel flat sides, said separating slit being carried from the face of the nut member to within a few threads of the spaced end of said central threaded bore, thence said line of separation being rotated clockwise relative to said face of said nut member and equi-laterally of the central bore in a plane parallel to said face of the nut through an arc of aproximately 120 degrees, said line of separation then being divided into two parallel lines of separation disposed on opposite sides of said threaded bore in planes parallel to said flat sides of said nut member and tangent to opposite sides of said threaded bore, and moving axially in said planes to separate said hook members from the half-nut portions from which they have thus been cut, thereby providing each of said half-nut portions with an outwardly extending hook member cut from the top of the other oppositely disposed hook member, said hook members curving outwardly around said threaded bore on opposite sides thereof and substantially encircling a bolt member threaded therebetween.

References Cited in the file of this patent

UNITED STATES PATENTS

| | | |
|---|---|---|
| 2,066,541 | Schenk | Jan. 5, 1937 |
| 2,676,509 | Graham | Apr. 27, 1954 |